United States Patent
Goswami et al.

(10) Patent No.: US 7,702,713 B2
(45) Date of Patent: Apr. 20, 2010

(54) HIGH SPEED FFT HARDWARE ARCHITECTURE FOR AN OFDM PROCESSOR

(76) Inventors: Debashis Goswami, B-310, Admiralty Ave. 79, Off 13$^{th}$ cross Indiranagar 2nd stage, Bangalore, Karnataka 560038 (IN); Gagandeep Singh, 1022-B New Pratap Nagar, near GT Road, Amritsar, Punjab 143001 (IN)

( * ) Notice: Subject to any disclaimer, the term of this patent is extended or adjusted under 35 U.S.C. 154(b) by 1062 days.

(21) Appl. No.: 11/277,366

(22) Filed: Mar. 24, 2006

(65) Prior Publication Data

US 2007/0226285 A1   Sep. 27, 2007

(51) Int. Cl.
*G06F 17/14*   (2006.01)

(52) U.S. Cl. ..................................................... 708/404

(58) Field of Classification Search .................. None
See application file for complete search history.

(56) References Cited

U.S. PATENT DOCUMENTS

| | | | | |
|---|---|---|---|---|
| 5,297,070 | A | * | 3/1994 | Hua et al. .................... 708/404 |
| 6,081,821 | A | * | 6/2000 | Hopkinson et al. .......... 708/406 |
| 6,658,441 | B1 | * | 12/2003 | Kim ........................... 708/404 |
| 2003/0212722 | A1 | * | 11/2003 | Jain et al. .................... 708/404 |
| 2005/0160127 | A1 | * | 7/2005 | Swartzlander et al. ...... 708/404 |
| 2005/0182806 | A1 | * | 8/2005 | Krishnamoorthi et al. ... 708/404 |
| 2006/0248135 | A1 | * | 11/2006 | Cousineau et al. .......... 708/404 |

* cited by examiner

*Primary Examiner*—David H Malzahn
(74) *Attorney, Agent, or Firm*—Ash Tankha

(57) ABSTRACT

A novel technique for providing high speed FFT architecture for OFDM processors that reduces silicon area while maintaining the high speed requirement. In one example embodiment, this is accomplished by pipelined and/or sequential implementation of two or more FFT stages so that each stage performs a small portion of the FFT.

14 Claims, 6 Drawing Sheets

US 7,702,713 B2

HIGH SPEED FFT HARDWARE ARCHITECTURE FOR AN OFDM PROCESSOR

TECHNICAL FIELD OF THE INVENTION

The present invention relates generally to Fast Fourier Transform (FFT) processors and more particularly to FFT processors that are used in Orthogonal Frequency Division Multiplexing (OFDM) digital communication systems.

BACKGROUND OF THE INVENTION

OFDM is becoming increasingly popular in design of high data rate communication and broadcasting systems. OFDM transmitting and receiving systems and methods are well known for audio, video and/or data communication. In general, OFDM is a spread spectrum technique that distributes data over a large number of carriers that may be spaced apart at various frequencies. More specifically, OFDM converts data input in series along the time axis into data in parallel, performs an Inverse Fast Fourier Transform (IFFT) with respect to the data in parallel, then converts the inverse-transformed data in parallel into data in series, and transmits the data in series to an OFDM receiver after translating to radio frequencies. The OFDM receiver down converts the input signal in frequency and generates a digital signal. In this case, the digital signal is transformed by a Fast Fourier Transform (FFT) so that the digital signal is restored to an original signal.

The main processing of the received OFDM signal is well known to those skilled in the art. Briefly, the OFDM receiver carries out the following operations: a low-frequency translation of the OFDM received, an analog to digital conversion followed by a serial to parallel conversion and a Discrete Fourier Transform (DFT) (being typically carried out by FFT). The DFT (by transforming the signals from the time to the frequency domain) carries out the demodulation of the OFDM signal thus allowing obtaining the digital signals carrying the symbols relative to each of the sub carriers on several outputs.

Thus, the DFT provides discrete frequency domain representation of a discrete time signal. The computation of the finite number of frequency domain samples is very efficient compared to the conventional continuous time Fourier Transform. Generally, the DFT is computationally intensive for large values of N involving direct computation complexity of $O(N^2)$ for the N point DFT, wherein O is an asymptotic upper bound function for large values of N. The DFT may be computed more efficiently by using FFT approach. One popular FFT approach known as radix 2 FFT has a complexity of $O(N \log 2N)$, in which the length of the FFT, N, is a power of 2.

The modern high data rate OFDM based wireless communication systems put an increasing demand on the speed requirement of FFT. The Application Specific Integrated Circuits (ASICs) device to implement OFDM must have a very high speed FFT processor, while keeping the die size and power consumption low.

Conventional FFT hardware architectures include trade-offs among complexity, power consumption, die size, and other such parameters. However, these architectures do not have the scalability to meet the high speed demands of the OFDM processor for the emerging high data rate wireless technologies, such as Ultra-Wideband (UWB) or 802.11n wireless standard that can support data rate of about 480 mbps and beyond, thereby demanding higher speed FFT processors.

SUMMARY OF THE INVENTION

The present subject matter provides high speed FFT architecture for OFDM processors. According to an aspect of the subject matter, there is provided architecture for a FFT processor that includes two or more FFT stages that are pipelined and/or sequential so that each stage performs a small portion of the FFT.

DETAILED DESCRIPTION OF THE INVENTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
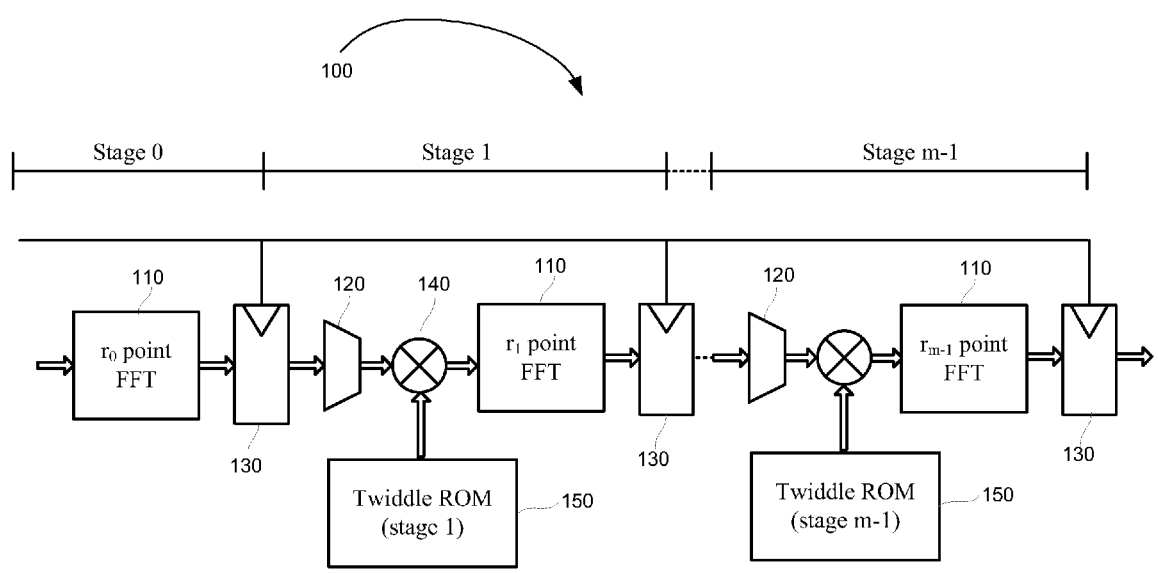
FIG. 1 is a block diagram illustrating an example m-stage pipelined/sequential FFT architecture implemented according to an embodiment of the present invention.

FIG. 1 is a block diagram 100 illustrating an example m-stage sequential FFT architecture according to the various embodiments of the present subject matter. The block diagram 100 shown in FIG. 1 illustrates stage 0 to stage m−1. As shown in FIG. 1, stage 0 includes an $r_0$ point FFT module 110 and a storage element 130. Further as shown in FIG. 1, each stage i subsequent to stage 0 includes a $r_i$ point FFT module 110, a Multiplexer (MUX) 120, the storage element 130, complex multipliers 140, and a Twiddle ROM 150.

In some embodiments, the Twiddle ROM is a Read Only Memory that stores the complex multiplication coefficients, known as Twiddle factors. In these embodiments, the Twiddle ROM is addressed by a counter that sequentially increments the address for the Twiddle ROM.

In operation, in one example embodiment, the $r_0$ point FFT module 110 of stage 0 receives N data signals and transforms $r_0$ data signals into individual $r_0$ point FFT symbols over $N/r_0$ clock cycles and stores the transformed $N/r_0$ symbols in the storage element 130.

In these embodiments, the N point FFT, N being a power of 2, is divided into a number of stages, in which each stage performs a smaller FFT of $r_i$ points, with $r_i$ being a power of 2 including m stages, wherein N is represented as:

$$N = \prod_{i=0}^{m-1} r_i$$

It can be seen that the above architecture does not impose any other constraint on the values of $r_i$. An efficient implementation of the above FFT architecture in hardware can be made by a selection of the number of stages and the size of the FFT at each stage to achieve a desired computational efficiency.

In some embodiments, each stage in the above-described architecture, except for the stage 0, have $r_i$ complex twiddle coefficient multipliers followed by the $r_i$ point FFT operation. In these embodiments, all the Twiddle ROM coefficients in stage 0 are set as 1, and hence no multiplication is required. The Twiddle ROM coefficients are then stored in m−1 read-only memories (such as the twiddle ROMs 150 shown in FIG. 1) of total size $$2 * \sum_{i=1}^{m-1} r_i * bt_i$$

bits, with $bt_i$ as the bit precision of the real/imaginary components of each twiddle coefficient in the i th stage.

Referring back to FIG. 1, the MUX 120 associated with stage 1 selects $r_1$ data signals from the received N data signals and outputs them to the complex multipliers 140 associated with stage 1. The complex multipliers 140 then receives Twiddle ROM coefficients from the Twiddle ROM memory 150 associated with the stage 1 and multiplies them with the received $r_1$ data signals and are outputted to the $r_1$ point FFT module 110 associated with stage 1.

In these embodiments, each stage is iterated $N/r_i$ times, to complete the processing of total N points. The Twiddle ROM coefficient multiplication is preceded by a set of multiplexers that selects the required input during each iteration. The intermediate results after iteration in each stage are stored in registers of the storage elements 130.

The total requirement of register bit storage in the above architecture can be computed as follows.

$$4N * \sum_{i=0}^{m-1} br_i,$$

for pipelined implementation and, $$2N * \sum_{i=0}^{m-1} br_i,$$

for the sequential implementation, wherein $br_i$ is the bit width of real/imaginary components of the outputs in the ith stage. The sequential implementation can require almost half the number of storage elements and this can translate into substantial reduction in hardware complexity in an ASIC design.

Figure 2:
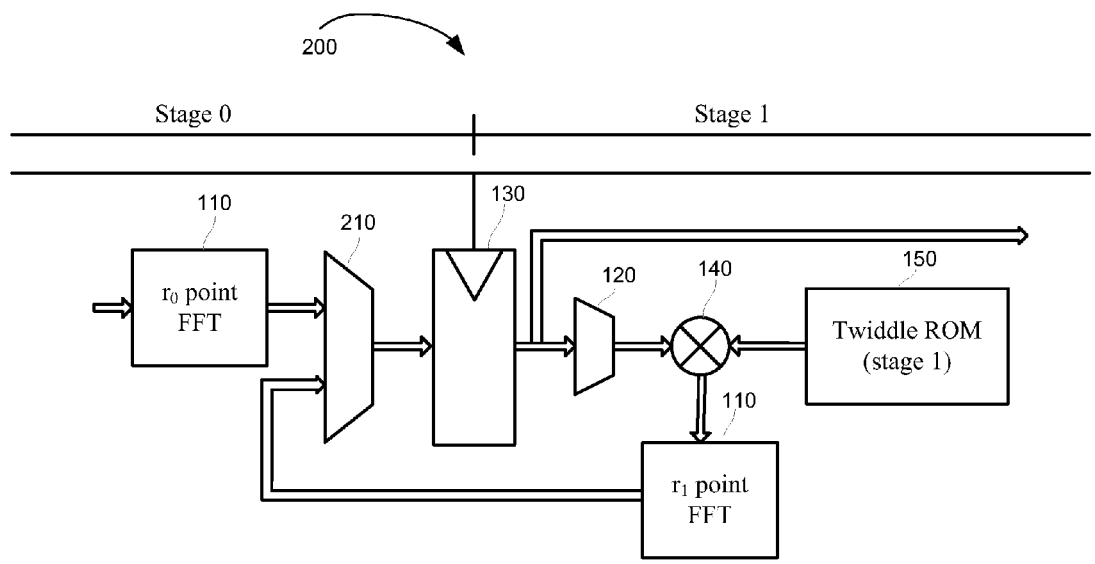
FIG. 2 is a block diagram illustrating an example two-stage sequential FFT architecture with a common storage element implemented according to an embodiment of the present invention.

In some embodiments, the present invention re-uses the storage elements in a sequential fashion to achieve a further reduction in the storage requirement however, this can lower the throughput. The block diagram 200 in FIG. 2 shows the storage elements 130 (shown in FIG. 1) being re-used in a two-stage implementation with only a total of $2N*br_0$ number of storage elements. The savings in storage in the scheme shown in FIG. 2 can be very significant and can result in a low gate count realization for large values of N.

Figure 3:
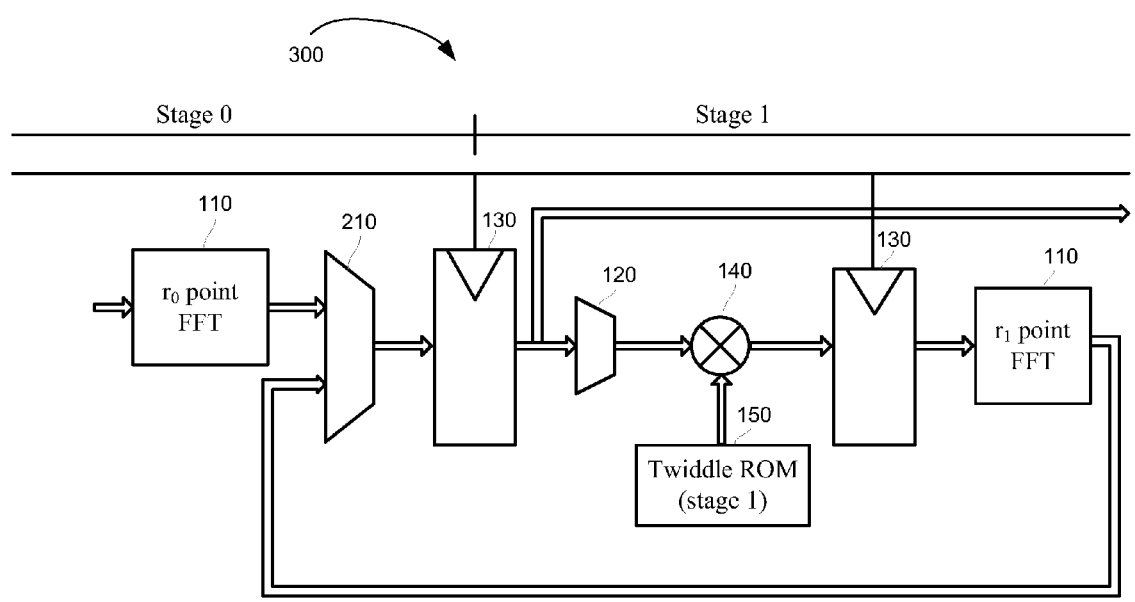
FIG. 3 is a block diagram illustrating an example two-stage sequential FFT with a common storage element and pipelined multiplier architecture implemented according to an embodiment of the present invention.

Referring now to FIG. 3, there is illustrated a block diagram 300, which shows another embodiment, of register storage usage after the twiddle multiplication. This can ease the timing critical path to allow the ASIC operation to take place at a higher frequency. The extra storage requirement in this embodiment can be only for $2*r_1$ complex points, hence the storage element size can be much smaller when compared to the size of the central storage requirement.

The block diagram 300 shown in FIG. 3 illustrates an example two-stage sequential FFT architecture with a common storage element and a pipelined multiplier. The block diagram 300 shown in FIG. 3 is similar to the block diagram 200 shown in FIG. 2 except that the second stage in the block diagram 300 further includes the storage element 130 to store the complex multiplier outputs. As a result, the complex multiplier and the $r_1$ point FFT blocks operate in a pipelined fashion.

In these embodiments, each $r_i$ point FFT is implemented in parallel with Twiddle factor multiplication using constant multipliers, rather than "true" multipliers. The constant multipliers require much smaller gate count/die size compared to true multipliers in an ASIC implementation.

Further in these embodiments, many Twiddle factors may have values of 1 that may not require any additional logic. Multiplication by Twiddle factors of −1 is implemented by a simple complement of 2's. Similarly, multiplication by j or −j can be implemented by swapping real/imaginary components and taking complement of 2's to the appropriate component. In general, the Twiddle factor multipliers implemented as constant multipliers internal to the $r_i$ point FFT at each stage can result in significant savings in hardware complexity/gate count.

Further in these embodiments, each stage except the stage 0 in the above-described architecture can require true complex multipliers before performing the FFT in each stage. The total number of true complex multipliers in the architecture can be computed as below:

$$\sum_{i=1}^{m-1} r_i$$

The speed/throughput of the above-described FFT architecture could be expressed in Mega complex samples per second ($R_s$), or number of complex samples per cycle ($R_c$).

The parameters $R_s$ and $R_c$ are related to clock frequency as follows:

$R_s = R_c * F$, wherein F is the frequency of operation of the FFT processor in MHz.

In a fully pipelined implementation of the above-described FFT architecture, the throughput can be computed as follows:

$R_c = \text{Min}[r_i], i=0, 1, \ldots m-1.$

For a sequential implementation using a single storage in all stages as shown in FIG. 1, the throughput can be computed as follows:

$$R_c = 1 \Big/ \sum_{i=0}^{m-1} 1/r_i$$

The $r_1$ point FFT module 110 shown in FIG. 1 then transforms the multiplied $r_1$ data signals over next ($N/r_1$) cycles. The $r_1$ point FFT module 110 then outputs the transformed $r_1$ symbols to the storage element 130 associated with stage 1 with an appropriate reordering after completion of both the shorter FFTs. The above-described process repeats itself for subsequent stages.

In these embodiments, the FFT in each stage uses parallel implementation. It implements the internal Twiddle factor multiplication as constant multipliers, resulting smaller gate count/die size compared to true multipliers in an ASIC implementation. In some embodiments, parallel implementation architectures is used as shown in FIGS. 7-10, for FFT sizes up to 16.

The FFT implementation of the present invention can be best understood in terms of a mathematical framework as described below.

The Discrete Fourier Transform, DFT, {X(k)} for a complex data sequence {x(n)} of length N, can be expressed as follows:

$$X(k) = \sum_{n=0}^{N-1} x(n) W_N^{kn} \quad 0 \le k \le N-1 \quad \text{for } 0 \le k \le N-1$$

Wherein coefficients computed using the equation $W_N = e^{\{-j2\pi/N\}}$ is known as the Twiddle factors.

The Inverse DFT (IDFT) is computed as follows:

$$x(n) = \frac{1}{N} \sum_{n=0}^{N-1} X(K) W_N^{-kn} \quad 0 \le k \le N-1$$

The context of the present invention is a class of efficient algorithms to compute DFT, known as Fast Fourier Transform (FFT), with the value of N being a power of 2. In these embodiments, inverse FFT (IFFT) may be performed by swapping the real and imaginary inputs, obtained after performing FFT, and swapping the real and imaginary outputs again. As a result, the same hardware architecture for FFT can be used for the IFFT operation.

In a matrix notation, the FFT operation can be described as a matrix multiplication as follows:

$[X] = [x] * [W]$

Wherein X and x are row matrices each with a size of 1×N and W is a square matrix of size N×N. The elements of the W matrix are Twiddle ROM coefficients. An integer matrix E could be defined as follows.

$[W] = e^{\{(-j2\pi/N)*[E]\}}$

The elements of the E matrix have a regular structure, and it is illustrative to generate this integer matrix for a given value of N.

For N=4, E is given as follows:

$$[E] = \begin{bmatrix} 0 & 0 & 0 & 0 \\ 0 & 1 & 2 & 3 \\ 0 & 2 & 4 & 6 \\ 0 & 3 & 6 & 9 \end{bmatrix}$$

For larger values of N=8 and beyond, E is created as follows.

$$[E] = \begin{bmatrix} 0 & 0 & 0 & 0 & 0 & 0 & 0 & 0 & \ldots \\ 0 & 1 & 2 & 3 & 4 & 5 & 6 & 7 & \ldots \\ 0 & 2 & 4 & 6 & 8 & 10 & 12 & 14 & \ldots \\ 0 & 3 & 6 & 9 & 12 & 15 & 18 & 21 & \ldots \\ 0 & 4 & 8 & 12 & 16 & 20 & 24 & 28 & \ldots \\ 0 & 5 & 10 & 15 & 20 & 25 & 30 & 35 & \ldots \\ 0 & 6 & 12 & 18 & 24 & 30 & 36 & 42 & \ldots \\ 0 & 7 & 14 & 21 & 28 & 35 & 42 & 49 & \ldots \\ \ldots & \ldots & \ldots & \ldots & \ldots & \ldots & \ldots & \ldots & \ldots \end{bmatrix}$$

The matrix W can be factored in m stages wherein $$N = \prod_{i=0}^{m-1} r_i$$

with $r_i$ being powers of 2.

$[W] = Rev([W_R])$ $[W_R] = [W_0] * ([M_1].[W_1]) \ldots * ([M_{m-1}].[W_{m-1}])$ The above operation Rev denotes a reordering operation of the matrix elements. Further, the above operation '.' denotes a matrix dot product, i.e., denotes an element by element multiplication. Furthermore, the above operation '*' denotes a matrix multiplication.

The matrices $W_0, W_1, \ldots W_{m-1}$, correspond to FFTs of size $r_0, r_1, \ldots r_{m-1}$, respectively. The matrices $M_1, \ldots M_{m-1}$, correspond to Twiddle ROM coefficient multiplication, obtained prior to performing the FFT operation using each stage.

Referring now to FIG. 2, there is illustrated a block diagram 200 of an example two-stage sequential FFT architecture according to the various embodiments of the present subject matter. The block diagram 200 shown in FIG. 2 is similar to the block diagram 100 shown in FIG. 1 except that the block diagram 200 has only the first two-stages, i.e., stage 0 and stage 1, and the FFT architecture is sequential with a common storage element.

As shown in FIG. 2, the stage 0 in the block diagram 200 includes the $r_0$ point FFT module 110, the MUX 210 and the storage element 130. Further as shown in FIG. 2, stage 1 includes the $r_1$ point FFT module 110, the storage element 130, the MUX 120, the complex multipliers 140, and the Twiddle ROM 150. In this sequential architecture embodiment the storage element 130 is reused to store stage 0 and stage 1 outputs using MUX 210.

Figure 4:
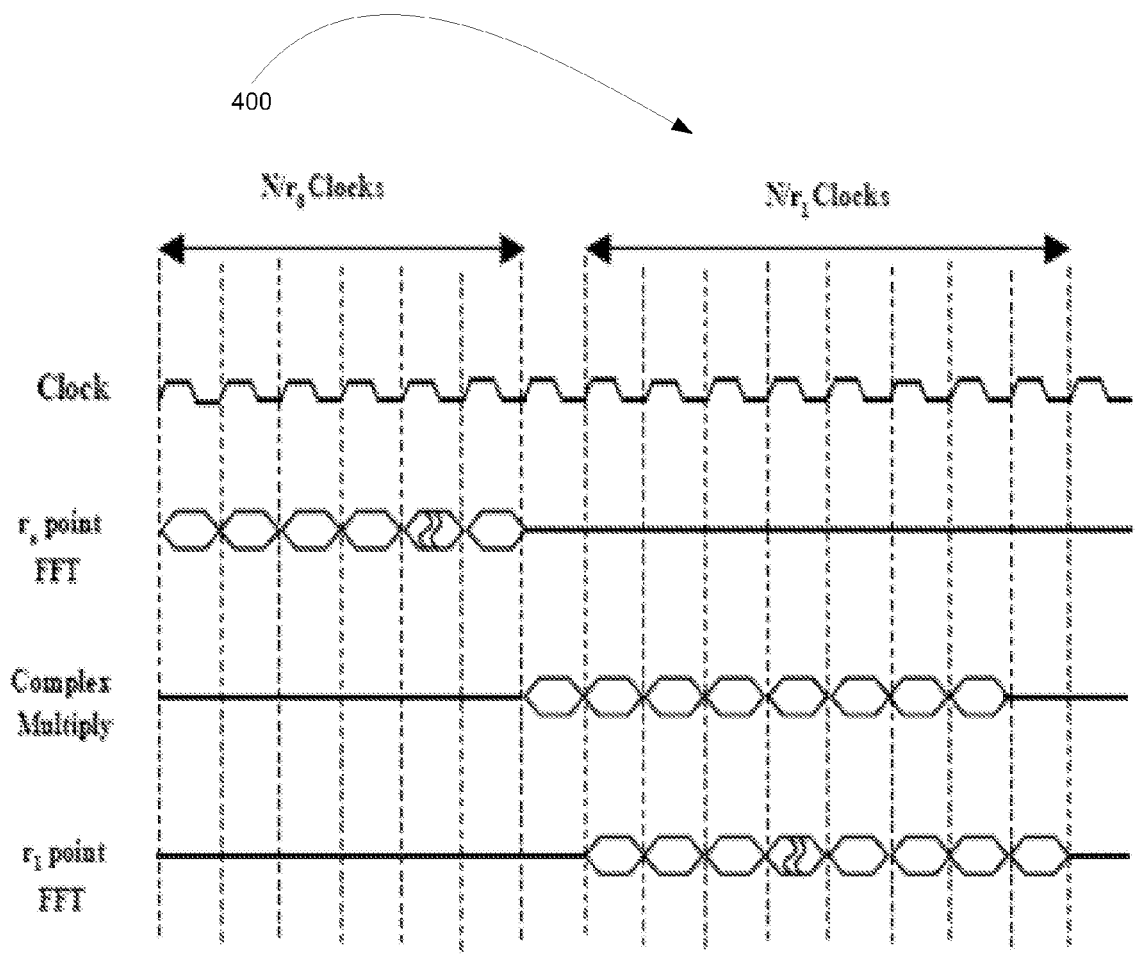
FIG. 4 is a timing diagram showing an example operation of the two-stage sequential FFT architecture with the pipelined multiplier shown in FIG. 3.

Referring now to FIG. 4, there is illustrated a timing diagram 400 that shows an example operation of the two-stage sequential multiplier FFT architecture shown in FIG. 3. As shown in FIG. 4, the $r_0$ point FFT operation is performed over $N/r_0$ clock cycles for $r_0$ samples of received N data signals at the stage 0. Further as shown in FIG. 4, the $r_1$ point FFT operation is over $N/r_1$ cycles for $r_1$ samples of the received N data signals in the stage 1. The complex multiplier cycles and the $r_1$ point FFT cycles overlap showing pipelined operation.

Figure 5:
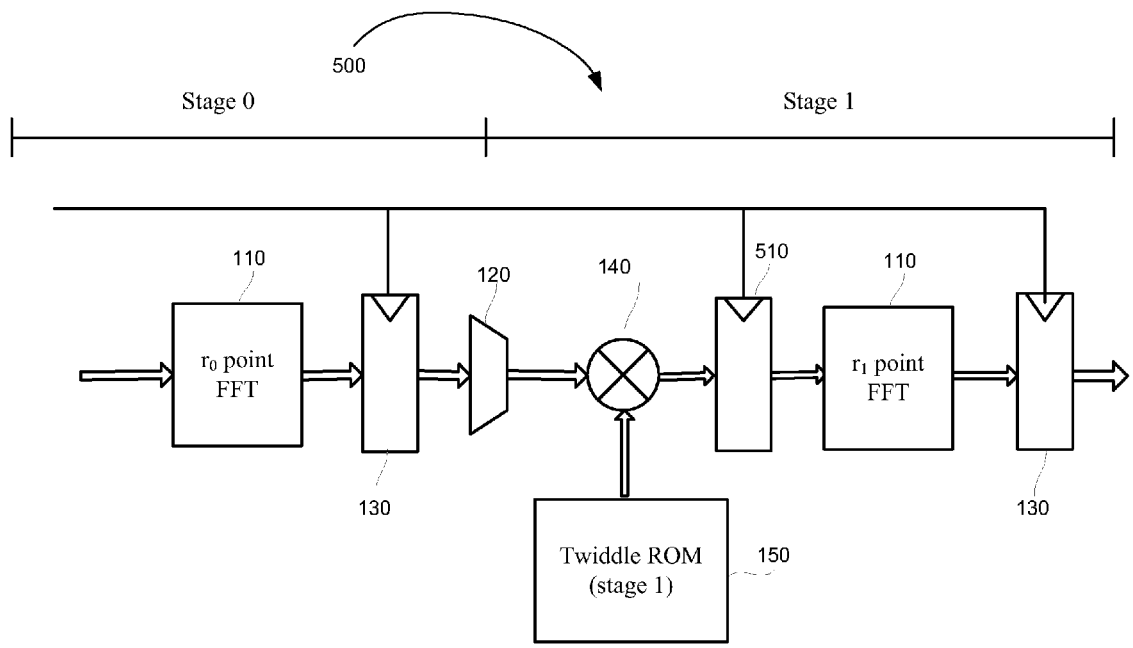
FIG. 5 is a block diagram illustrating an example two-stage pipelined FFT architecture with a pipelined multiplier for stage 1 implemented according to an embodiment of the present invention.

FIG. 5 is a block diagram 500 illustrating an example two-stage pipelined FFT architecture with a pipelined multiplier according to the various embodiments of the present subject matter. The block diagram shown in FIG. 5 is similar to the block diagram 100 shown in FIG. 1 except that the block diagram 500 has only stages 0 and 1 of 0 to m−1 stages with a pipelined implementation. In addition, there is a first storage element 510 associated with second stage that is coupled to the complex multipliers to enable pipelined operation. Further, there is a second storage element 130 associated with the second stage for the final output of FFT.

Figure 6:
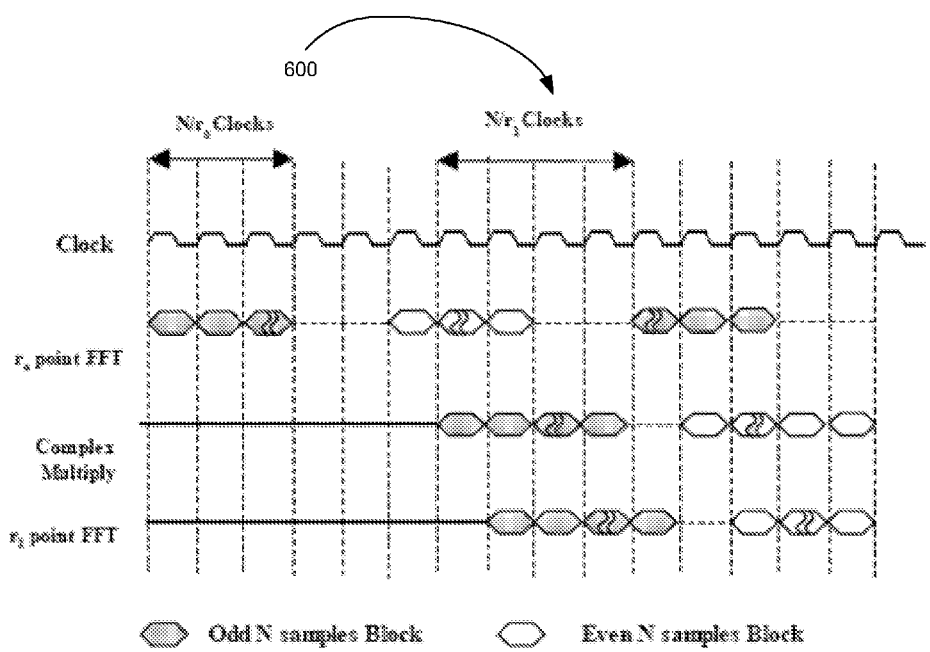
FIG. 6 is a timing diagram showing an example operation of the two-stage pipelined FFT with a pipeline multiplier shown in FIG. 5.
Figure 7:
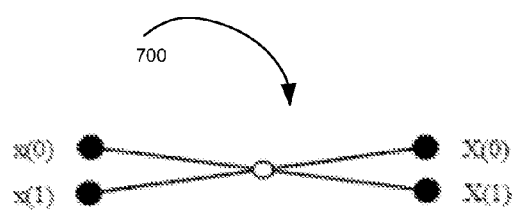
FIG. 7 is a graph showing an example 2 point parallel FFT implementation for a single stage using the FFT architecture shown in FIGS. 1-5.
Figure 8:
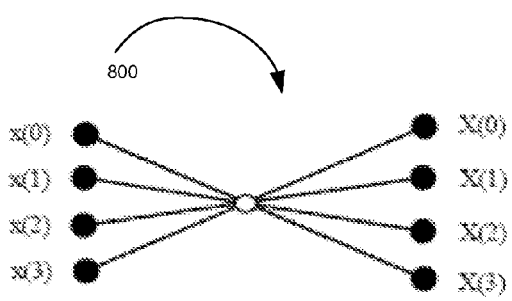
FIG. 8 is a graph showing an example 4 point parallel FFT implementation for a single stage in the embodiment of the present invention.
Figure 9:
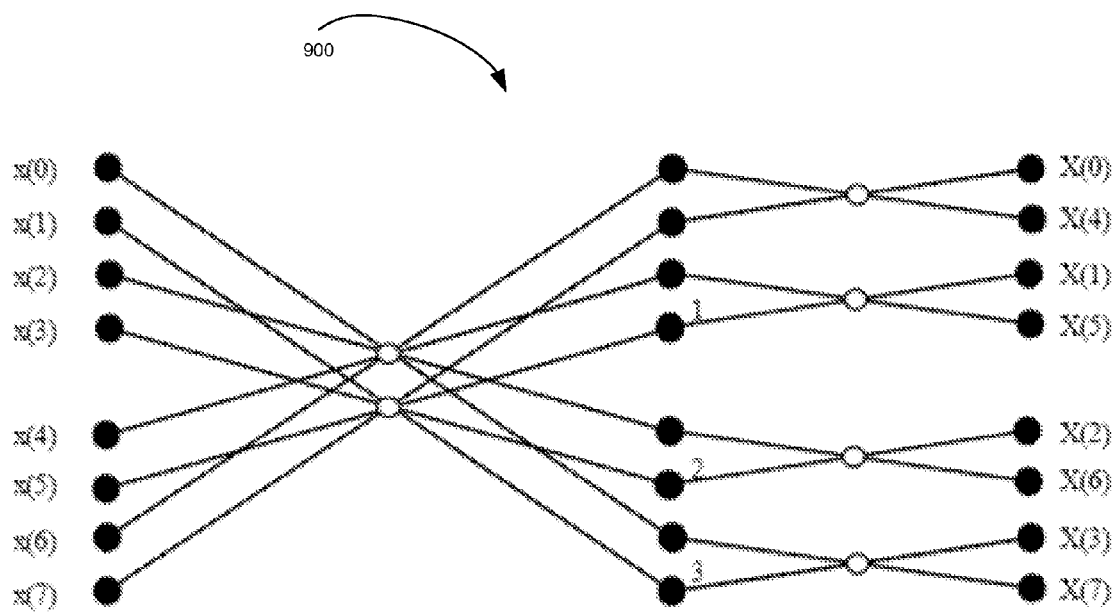
FIG. 9 is a graph showing an example 8 point parallel FFT implementation for a single stage in the embodiment of the present invention.
Figure 10:
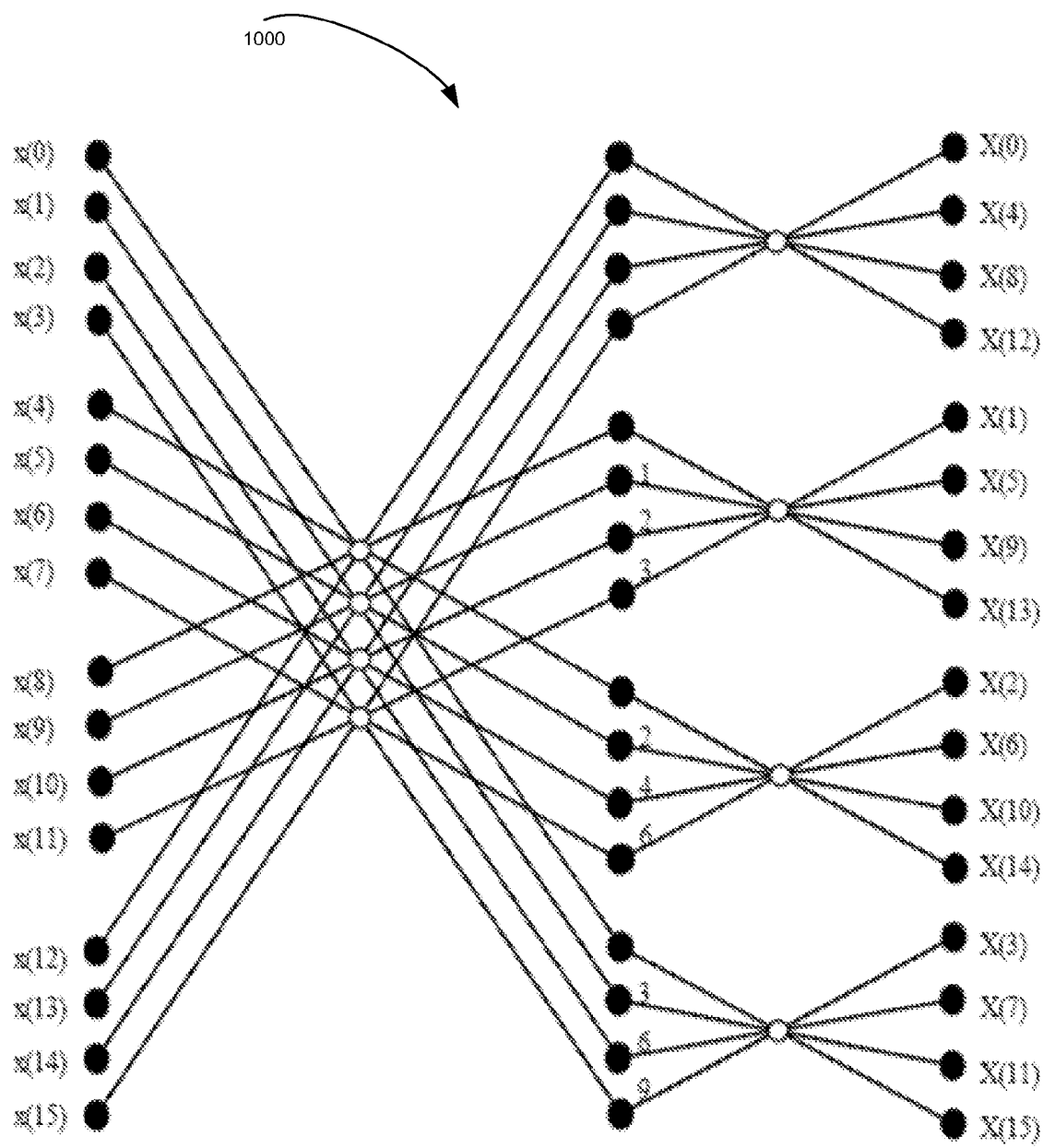
FIG. 10 is a graph showing an example 16 point parallel implementation for a single stage in the embodiment of the present invention.

Referring now to FIG. 6, there is illustrated a timing diagram 600 that shows an example operation of the two-stage pipelined FFT architecture with a pipeline multiplier shown in FIG. 5. As shown in FIG. 6, the $r_0$ point FFT operation is performed over $N/r_0$ clock cycles for N samples of received data signals at the stage 0. Further as shown in FIG. 6 the $r_1$ point FFT operation is performed in stage 1 in pipelined manner. The storage element associated with stage 1 stores 2N samples of received data signals, thereby resulting in a parallel operation achieving a higher throughput.

The above-described technique provides high throughput and meets the requirements of high date rate OFDM processor used in modern wireless communication systems, such as Ultra-Wideband (UWB) or 802.11n. The stages described in the above process can be implemented either in pipelined or sequential fashion based on the throughput requirements. The sequential implementation can reduce register storage requirement, which is generally very expensive in Application Specific Integrated Circuits (ASICs). This process provides high speed FFT/IFFT processing, while minimizing the hardware complexity/ASIC die size. Further, the above process can provide a significant reduction in die size and/or silicon area in ASIC applications, while maintaining the speed and/or throughput requirements of FFT in high speed OFDM processors.

Further, this architecture uses a multiple FFT stages, wherein each stage performing a smaller FFT to reduce the hardware complexity that exists in conventional FFT architectures. In general, only a two-stage architecture shown in FIG. 2 will suffice for almost all the high speed applications requiring FFT transformations. The above-described architecture uses a higher order FFT, such as 8 point or 16 point to achieve a reduction in the hardware complexity. However, this technique does not impose any limitation on the FFT size used in each stage. In addition, the control structure required to implement the above technique can be a fairly simple counter to control the complex multipliers inputs in a stage.

Also, the input bit width used in OFDM transmitter and receiver is generally small (about 3 to 5 bits). Therefore, stage 0 in the above-described architecture can have a larger FFT length, thereby including a large number of adders and constant multipliers with trivial complexity. Furthermore, the above technique at each stage uses parallel implementation, which includes Twiddle factor multiplication as constant multipliers. Generally, constant multipliers are very efficient in terms of gate count when compared with using true multipliers in an ASIC implementation. FIGS. 7-10 show diagrams 700, 800, 900, and 1000 of example parallel implementations of 2 point FFT, 4 point FFT, 8 point FFT, and 16 point FFT, respectively.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements.

FIGS. 1-10 are merely representational and are not drawn to scale. Certain proportions thereof may be exaggerated, while others may be minimized. FIGS. 1-10 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. An FFT for an OFDM processor comprising:
two or more FFT stages that receives a set of N data signals, wherein each FFT stage performs FFT operation on $r_i$ data signals and outputs transformed N data signals, wherein $r_i$ is computed using the equation $$N = \prod_{i=0}^{m-1} ri$$

wherein $r_i$ is a power of 2 and m being a number of stages in the FFT.

2. The FFT of claim 1, wherein the two or more FFT stages comprise a first stage (stage 0) FFT and one or more subsequent FFT stages (i th stage, i=1 to (m−1)), wherein the first stage FFT comprises:
- a $r_0$ point FFT module to transform the $r_0$ samples of received N data signals over (N/$r_0$) clock cycles; and
- a storage element coupled to the $r_0$ point FFT module that stores the $r_0$ transformed samples of data signals received from the $r_0$ point FFT stage module and accumulates intermediate outputs of the stage 0.

3. The FFT of claim 2, wherein each of the one or more subsequent FFT stages (i th stage, i=1 to (m−1)) comprise:
- a MUX to receive the N data signals associated with the i th stage and outputs $r_i$ samples of data signals;
- a Twiddle ROM;
- complex multipliers connected to the MUX receives the $r_i$ sample of data signals from the MUX and associated subsequent stage Twiddle ROM coefficients from the Twiddle ROM and outputs complex multiplied $r_i$ data signals;
- a $r_i$ point FFT module to transform the received $r_i$ data signals; and
- a storage element coupled to store the transformed $r_i$ data signals received from the $r_i$ point FFT module and accumulates intermediate outputs of the i th stage.

4. The FFT of claim 3, wherein a number of bits required in the Twiddle ROM in each stage is computed using the equation $$2 * \sum_{i=1}^{m-1} r_i * bt_i$$

bits wherein $bt_i$ is a bit precision of the real/imaginary components of each twiddle coefficient in the i th stage.

5. The FFT of claim 3, wherein the Twiddle ROM is a Read Only Memory that stores the complex multiplication coefficients, and wherein the Twiddle ROM is addressed by a counter that sequentially increments the address for the Twiddle ROM.

6. A two-stage sequential FFT for an OFDM processor comprising:
- a first stage, wherein the first stage comprises:
  - a $r_0$ point FFT module to transform $r_0$ samples of received N data signals over (N/$r_0$) clock cycles;
  - a MUX associated with first stage;
  - a storage element coupled to the MUX associated with the first stage;
- a second stage coupled to the first storage element of the first stage, wherein the second stage comprises:
  - a MUX associated with the second stage to select a set of $r_1$ samples from the storage element;
  - a Twiddle ROM associated with the second stage;
  - complex multipliers connected to the MUX and the Twiddle ROM associated with the second stage receives the $r_1$ samples of data signals from the MUX associated with the second stage and Twiddle ROM coefficients from the Twiddle ROM associated with the second stage and outputs complex multiplied $r_1$ data signals; and
  - an $r_1$ point FFT module coupled between the complex multipliers and the MUX associated with the first stage transforms the received complex multiplied $r_1$ data signals and outputs transformed N data signals via the MUX and the storage element associated with the stage 0.

7. The FFT of claim 6, wherein a number of bits required in the Twiddle ROM in each stage is computed using the equation $$2 * \sum_{i=1}^{m-1} r_i * bt_i$$

bits wherein $bt_i$ is a bit precision of the real/imaginary components of each twiddle coefficient in the i th stage and $r_i$ is computed using the equation $$N = \prod_{i=0}^{m-1} ri$$

wherein $r_i$ is a power of 2 and m being a number of stages in the FFT.

8. The FFT of claim 6, wherein the Twiddle ROM is a Read Only Memory that stores the complex multiplication coefficients, and wherein the Twiddle ROM is addressed by a counter that sequentially increments the address for the Twiddle ROM.

9. A two-stage sequential FFT for an OFDM processor comprising:
- a first stage, wherein the first stage comprises:
  - a $r_0$ point FFT module to transform the $r_0$ samples of received N data signals over (N/$r_0$) clock cycles;
  - a MUX associated with the $r_0$ point FFT module of first stage;
- a second stage coupled to a storage element of the first stage, wherein the second stage comprises:
  - a MUX associated with the second stage to select a set of $r_1$ samples from the storage element of the first stage;
  - a Twiddle ROM associated with the second stage;
  - complex multipliers connected to the MUX and the Twiddle ROM associated with the second stage receives the $r_1$ samples of data signals from the MUX associated with the second stage and Twiddle ROM coefficients from the Twiddle ROM associated with the second stage and outputs complex multiplied $r_1$ data signals;
  - a storage element associated with the second stage receives the complex multiplier output of $r_1$ data signals and stores the complex $r_1$ data signals; and
  - an $r_1$ point FFT module coupled to the storage element associated with the second stage receives the stored $r_1$ data signals and transforms the received $r_1$ data signals and outputs the transformed N data signals via the MUX and the storage element associated with the first stage (stage 0).

10. The FFT of claim 9, wherein a number of bits required in the Twiddle ROM in each stage is computed using the equation $$2*\sum_{i=1}^{m-1} r_i * bt_i$$

bits wherein $bt_i$ is a bit precision of the real/imaginary components of each twiddle coefficient in the i th stage and $r_i$ is computed using the equation $$N = \prod_{i=0}^{m-1} ri$$

wherein r is a power of 2 and m being a number of stages in the FFT.

11. The FFT of claim 9, wherein the Twiddle ROM is a Read Only Memory that stores the complex multiplication coefficients, and wherein the Twiddle ROM is addressed by a counter that sequentially increments the address for the Twiddle ROM.

12. A two-stage pipelined FFT architecture for an OFDM processor comprising:
a first stage (stage 0), wherein the first stage comprises:
  a $r_0$ point FFT module to transform the $r_0$ samples of received N data signals over (N/$r_0$) clock cycles; and
  a storage element coupled to the $r_0$ point FFT module that stores the $r_0$ transformed samples of data signals received from the $r_0$ point FFT stage module and accumulates the intermediate outputs of the first stage (stage 0);
a second stage coupled to the storage element of the first stage, wherein the second stage comprises:
  a MUX associated with the second stage to select a set of $r_1$ samples from the storage element of the first stage;
  a Twiddle ROM associated with the second stage;
  complex multipliers connected to the MUX and the Twiddle ROM receives the $r_1$ samples of data signals from the MUX and Twiddle ROM coefficients from the Twiddle ROM and outputs complex multiplied $r_1$ data signals;
  a first storage element associated with the second stage receives the complex multiplier output of $r_1$ data signals and stores the complex $r_1$ data signals;
  an $r_1$ point FFT module coupled to the first storage element associated with the second stage receives the stored $r_1$ data signals and transforms the received $r_1$ data signals and outputs the transformed N data signals; and
  a second storage element associated with the second stage coupled to the $r_1$ point FFT module stores and outputs the transformed N data signals.

13. The FFT of claim 12, wherein a number of bits required in the Twiddle ROM in each stage is computed using the equation $$2*\sum_{i=1}^{m-1} r_i * bt_i$$

bits wherein $bt_i$ is a bit precision of the real/imaginary components of each twiddle coefficient in the i th stage and $r_i$ is computed using the equation $$N = \prod_{i=0}^{m-1} ri$$

wherein $r_i$ is a power of 2 and m being a number of stages in the FFT.

14. The FFT of claim 12, wherein the Twiddle ROM is a Read Only Memory that stores the complex multiplication coefficients, and wherein the Twiddle ROM is addressed by a counter that sequentially increments the address for the Twiddle ROM.

* * * * *